Sept. 16, 1958  W. H. P. POULIART ET AL  2,852,253
PNEUMATIC TAPE DRIVE

Filed Feb. 2, 1954  3 Sheets-Sheet 1

Inventors
W.H.P. POULIART
L.J. NYS
By
Attorney

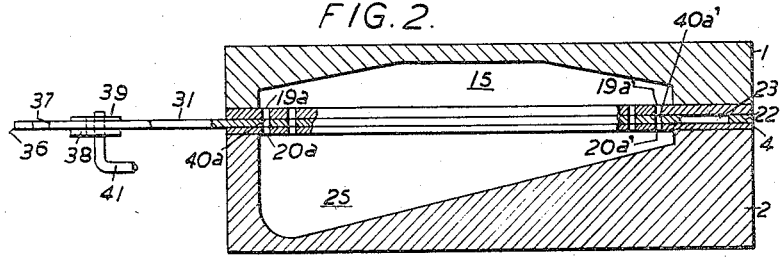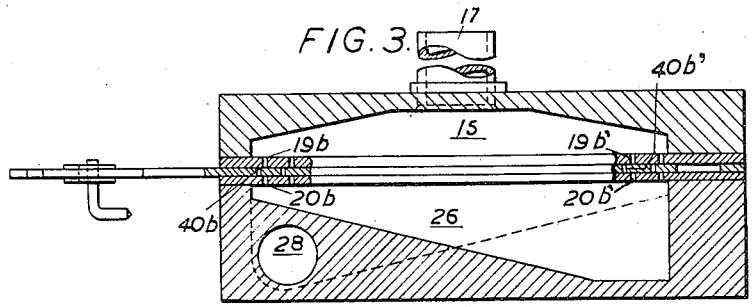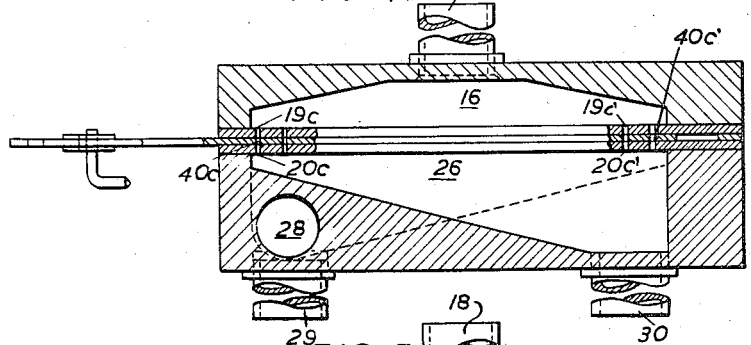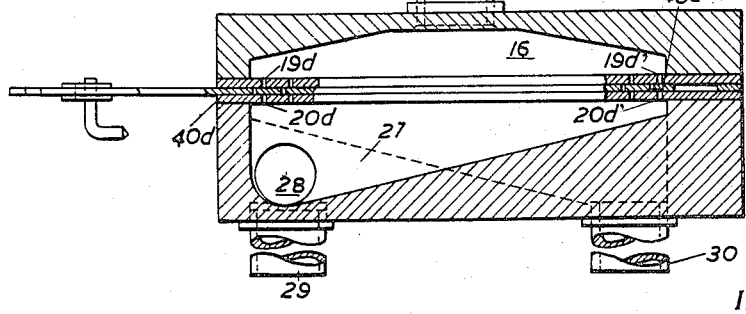

Sept. 16, 1958    W. H. P. POULIART ET AL    2,852,253
PNEUMATIC TAPE DRIVE

Filed Feb. 2, 1954    3 Sheets-Sheet 3

Inventors
W. H. P. POULIART-
L. J. NYS
By RPMorris
Attorney

United States Patent Office 2,852,253
Patented Sept. 16, 1958

2,852,253

PNEUMATIC TAPE DRIVE

Willy Hortense Prosper Pouliart and Louis Jacques Chislain Nys, Antwerp, Belgium, assignors to International Standard Electric Corporation, New York, N. Y., a corporation of Delaware Application February 2, 1954, Serial No. 407,794

Claims priority, application Belgium February 26, 1953

5 Claims. (Cl. 271—2.3)

The present invention relates to a pneumatic tape drive.

An object of the invention is to provide a pneumatic clutch for a tape.

Another object of the invention is to provide an air control valve cooperating with said pneumatic clutch.

A further object of the invention is to provide a driving mechanism for said air control valve.

According to a feature of the invention the instantaneous motions of a magnetic tape are controlled by means of an air valve which applies simultaneously a pressure on one face and a vacuum on the opposite face of the tape, the pressure and the vacuum being reversed very rapidly.

According to another feature of the invention the valve comprises at least two independent chambers respectively connected to a piping for pneumatic air and to a vacuum piping, the two chambers communicating by means of a set of ports and of a shutter to other chambers which communicate with pipes alternatively under pressure and vacuum.

According to another feature of the invention the tape placed on a rotor permanently rotating is driven almost instantaneously by the latter when a vacuum is produced on the periphery of said rotor which vacuum sucks one face of the tape, whilst on the other face an air pressure is applied by a casing concentric to said rotor.

According to another feature of the invention the tape placed on a rotor permanently rotating is separated from the latter and almost instantaneously braked when an air pressure is applied on the periphery of said rotor whilst a vacuum is produced on the periphery of the casing.

The above mentioned and other objects and features of the invention will become more apparent and the invention itself will be best understood by referring to the following description of an embodiment taken in conjunction with the accompanying drawings in which:

Figs. 2, 3, 4 and 5 show vertical sectional views, made respectively along different rows of ports of said pneumatic valve.

Figure 1:
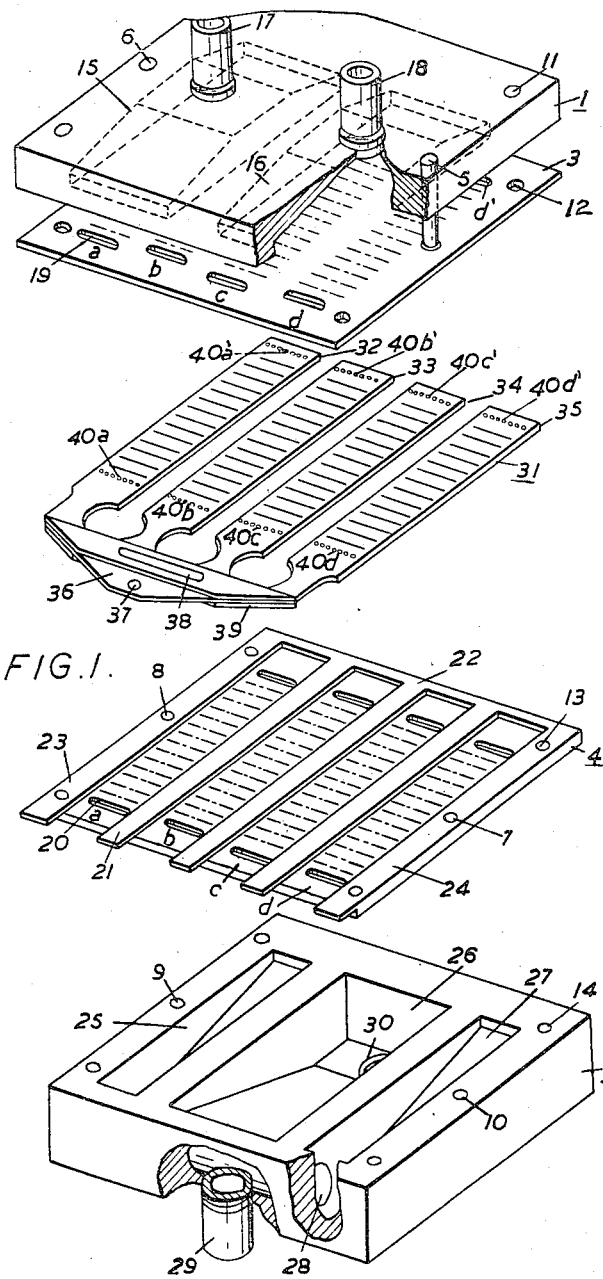
Fig. 1 shows an exploded view of the pneumatic valve according to the invention.

The description will be made first with reference to Fig. 1.

The valve comprises essentially two covers 1 and 2 located on both sides of fixed distribution grates 3 and 4. Guiding pillars 5 and 6 forming part of the cover 1 pass through holes provided in the grates 3 and 4, for instance holes 7 and 8 for grate 4, and fit in holes 10 and 9 of the cover 2. Thus the relative position between the grates 3 and 4 and the covers 1 and 2 are secured with precision. The mounting is carried out by any suitable fixing means to be inserted in the holes such as 11, 12, 13 and 14.

The cover 1 comprises two identical chambers 15 and 16, independent one from another and in communication with the exterior respectively via pipes 17 and 18. The chambers 15 and 16 emerge in a trued up surface opposite to the one carrying pipes 17 and 18. The Figs. 2 to 5 clearly show the sections of the chambers 15 and 16.

The grate 3, shown in Fig. 1, suitably trued up to fit against the cover 1, comprises four rows $a$, $b$, $c$, $d$ of ports 19, the rows being parallel along their axis direction and the ports 19 as well.

The ports, such as 19, are so arranged that those of row $a$ are in line with those of the row $c$, whereas those of the row $b$ are in line with those of the row $d$. A certain shift therefore exists between the ports of rows $a$—$c$ and $b$—$d$. The two faces of the grate 3 are rigorously trued up and parallel.

The grate 4, Fig. 1, comprises the ports 20 identical to ports 19 of the grate 3 and similarly arranged. The grate 4 further comprises, on one of its faces, thicker parts such as 21, separating the rows $a$, $b$, $c$, $d$, and 22, 23, 24, surrounding the grate on three of its edges. Said thicker parts are perfectly trued up and their level is rigorously parallel to the two surfaces delimiting the smallest thickness of the grate.

The cover 2, Fig. 1, comprises three chambers 25, 26, 27. The chambers 25 and 27 communicate by a passage 28 communicating with the exterior via the pipe 29. The chamber 26 communicates with the exterior via the pipe 30. The chambers open on a trued up surface of the cover 2.

The parts herebefore described are fixed and once mounted, they keep their relative position, as determined by the guiding pillars 5 and 6.

On the other hand, the shutter 31, Fig. 1, is mobile. It comprises a plate, cut in such a way as to form parallel strips 32, 33, 34, 35, joined together at one end by the common crosshead 36 forming part of said plate. Circular shaped cuts are made at the joining end of said parallel strips to the common crosshead to improve their flexibility in all directions.

To drive the shutter, a hole 37 is provided in the cross head 36 and a stud-hole 38 is provided in the thicker part 39, which stud-hole, combined with a piece part described thereafter, is used to limit the travel of the shutter.

The shutter strips 32 to 35 are perforated, as shown in Fig. 1. The perforations 40 are all in line, as well in the direction of the length of the strip as in the perpendicular direction. The strips have very nearly the same thickness as the bulging height of the thicker parts 21 and 24. Said strips, except for the space provided for clearance, have the same width as the space between two bulging thicker parts 21, bulging thicker parts 23 and 21, bulging thicker parts 21 and 24. In this manner the shutter 31 slides with soft friction in the spaces provided by the assembly of grates 3 and 4.

Fig. 2 shows a sectional view of this assembly.

Figs. 2 to 5 show that the ports 19$a$ and 19$a'$ correspond exactly to ports 20$a$ and 20$a'$ and so forth for each of rows $a$, $b$, $c$, $d$. The shift between the ports of rows $a$—$c$ and the ports of rows $b$—$d$ can be seen by comparison respectively of Figs. 2–4 and 3–5. As the perforations 40$a$, 40$b$, 40$c$, 40$d$, are all in line, those (for instance 40$a$—40$c$) which correspond to ports (in this case 19$a$—20$a$ and 19$c$—20$c$) establish separately a communication between the chambers (15—25 and 16—26) of covers 1 and 2, whilst the other perforations (in this case 40$b$—40$d$) suppress the communication between other chambers (15—26 and 16—27) of these same covers. Figs. 2 to 5 show the shutter drawn to its outer left position. Its inner right position is not shown, but in the latter position communications between chambers are established which are reverse with respect to the preceding ones.

To limit the travel of the shutter 31, a stop pin 41 passes through the studhole 38. The stop pin is fixed.

To limit the leakages and insure a good working, the shutter 31 is built of nylon impregnated with a lubricating material. Thus, the clearance between the shutter and the grates 3 and 4 is reduced to a strict minimum and the jams are eliminated.

The detailed working of the valve will now be described referring to Figs. 1 to 5. To simplify the description we will assume that an air pressure is produced, via a link, in the pipe 17, whilst a vacuum is produced, via another link, in the pipe 18. The shutter occupies the drawn out position.

The air enters the chamber 15 (Fig. 1), then flows through ports such as 19a and 19b. The perforations such as 40b in strip 33 not facing the ports such as 19b and 20b (Fig. 3), the air is stopped and cannot reach the chamber 26. On the other hand, the air under pressure flows through the perforations such as 40a in strip 32, through the ports such as 20a (Fig. 2) and from there flows to the chamber 25.

From the chamber 25, the air flows in the passage 28 and is evacuated via the pipe 29. The air also induced in chamber 27 is stopped by the closure of ports 19d and 20d (Fig. 5). The use of the air under pressure which is evacuated via the pipe 29 will be described hereafter.

In short, when the shutter is drawn out (Figs. 1 to 5); the air under pressure entering the pipe 17, flows into the chambers 15 and 25 and is evacuated through the pipe 29, whilst the suction is exerted via the pipe 18, the chambers 16 and 26 and the pipe 30.

When the shutter is drawn in (position not shown), the communications are reversed, the pipe 29 is subject to a vacuum and the pipe 30 is subject to a pressure. However, the pipe 17 remains connected to the pneumatic air piping and the pipe 18 to the vacuum piping. If required, these supply pipings could be connected respectively to pipes 29 and 30, the working of the valve would be inverted but the principle remains unchanged.

It will be noticed during the working that, when the shutter closes the ports, a pressure is exerted on one of its faces whilst the other face is subject to a vacuum. This results in a tighter port closure and consequently the communications between chambers subject to unequal pressures are made impossible.

The valve just described can be operated by any driving mechanism able to insure a linear reciprocating motion. An electromagnet, designed for instance as the motor of an electrodynamic loudspeaker, satisfies this condition and permits further, due to its low inertia, to reach high linear speeds. The motor of a classical loudspeaker of the permanent magnet type comprises a magnetised yoke in the centre of which stands a cylindrical core. An air gap is made between the yoke and the core to allow a moving coil to pass through. The moving coil comprises a winding mounted on a cardboard mandrel.

Figure 6:
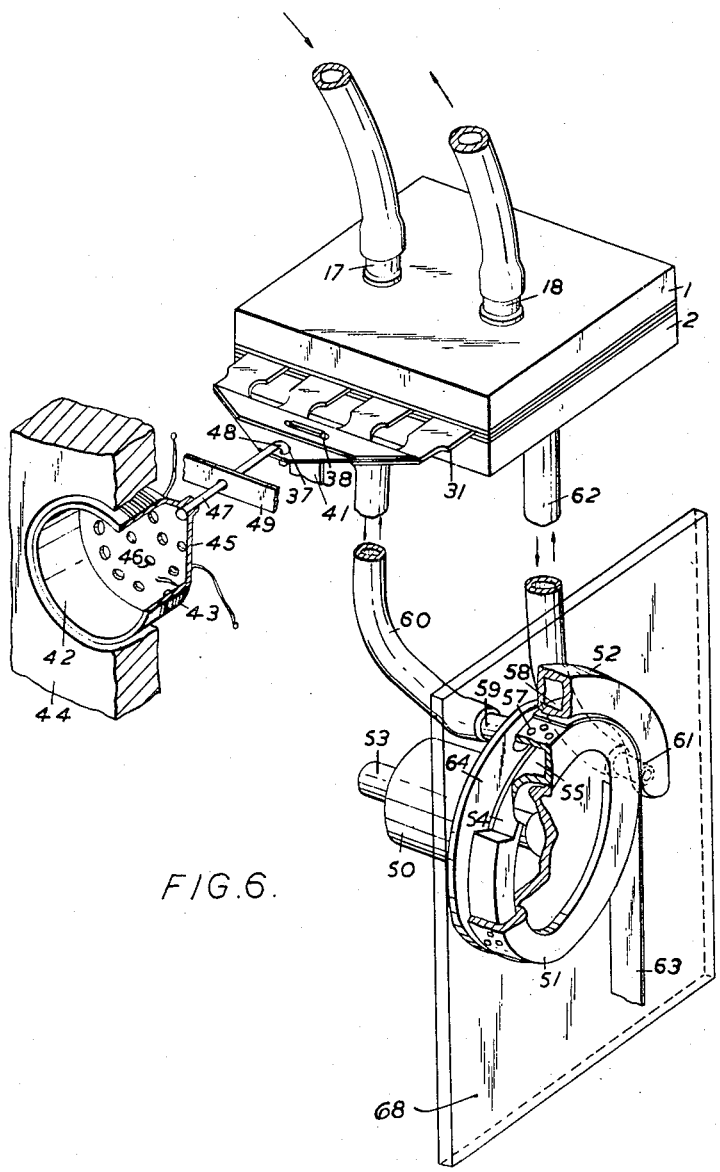
Fig. 6 shows a complete view of said pneumatic valve and its motor, together with the associated driving mechanism.

In Fig. 6 the motor also comprises a moving coil constituted by a mandrel 42 and winding 43 (partial views). The coil is placed in the air gap between the yoke 44 and the core (not shown).

The mandrel 42 is extended by a conical surface 45 slotted with apertures 46. Said apertures limit the damping due to the air resistance during the motion of the moving coil.

The mandrel 42 is extended by a rod 47 which is terminated by a hook 48 slipped into the hole 37 of the shutter 31. In this manner, all motions of the moving coil are transmitted to the shutter 31.

By inverting the polarity of the controlling current flowing through the winding 43, it is possible to obtain a linear reciprocating motion, the current flowing in said winding determining the reaction direction with respect to the energizing field of the yoke 44.

Additional mechanical devices can secure the two stable positions of the shutter 31 (for instance, a membrane 49 fixed on rod 47 and in between two diametrically opposed supports which are not shown, said membrane being subject to such deformations as to occupy two stable positions according to the one or the other direction of motion). However, the travel of the shutter 31 remains limited by the stop pin 41, against which the walls of the studhole 38 alternately butt.

For a particular use, for instance magnetic tape stopstart, the equicurrent valve just described is connected to a driving mechanism briefly described as follows:

As shown in Fig. 6, this mechanism comprises a stator 50, a rotor 51 and a casing 52. The theoretical axis of the rotor is coaxial with that of the stator 50 (axis 53 = physical axis of rotor 51). The periphery of stator 50 is provided with a cavity 54 closed by the outline of rotor 51 so as to form a chamber 55.

The rotor's external surface is perforated with holes 57 so as to enable the chamber 55 to communicate with the exterior. The casing 52 is concentric with the rotor 51, and is slightly distant from said rotor. The casing comprises on its periphery holes 58 made as shown in Fig. 6.

The stator 50 is connected to one of the valve pipes, for instance pipe 29, the casing 52 is connected to the other pipe 30. In this manner if a pressure is exerted in pipe 29, said pressure is applied to the stator via pipe 59 opening in the chamber 55 (via an intermediate linking tube 60). Said pressure leaks out via the holes 57 of rotor 51. In this case, the pipe 30 is subject to a vacuum which is communicated to the casing 52 via the pipe 61 opening in the latter (via an intermediate linking tube 62). The holes 58 of the casing 52 are subject to a vacuum.

Assuming that the rotor 51 permanently rotates by the drive of a motor (not shown), the tape 63 placed between the rotor 51 and the casing 52 is pressed against the rotor if a pressure is produced in the casing 52 and a vacuum in the rotor 51. The tape 63 is driven almost instantaneously. On the other hand, if a pressure is produced in the rotor 51 and a vacuum in the casing 52, the tape 63 is pressed against the casing 52 and the tape is stopped almost instantaneously.

The lateral travel of the tape 63 is guided on one side by the edge 64 of the stator 50, and on the other side by the plate 68 of transparent material which is preferably removable to allow tape manipulations.

While the principles of the invention have been described above in connection with specific embodiments and particular modifications theerof, it is to be clearly understood that this decription is made only by way of example and not as a limitation on the scope of the invention.

We claim:

1. A high speed pneumatically controlled tape drive comprising first and second members so positioned that said tape may be transported therebetween, one of said members being stationary, means for continuously moving the other of said members, means applying a blast of air against one side of the tape forcing the tape towards one of said members, means applying simultaneously a suction to the other side of said tape, whereby the tape is forced more rapidly towards said one member, and means for reversing the operation of said blast and suction applying means to cause said tape to adhere to the other of said members.

2. A high speed pneumatically controlled tape drive, as defined in claim 1, in which the means for applying air blast and suction to the sides of the tape comprises a plurality of holes in each of the members, and communicating means between the opposite ends of said holes from said tape and the means for reversing the operation of the blast and suction means.

3. A high speed pneumatically controlled tape drive, as defined in claim 1, in which the continuously moving member comprises a rotatably mounted drum with a hollow rim having a plurality of spaced apertures in the periphery thereof communicating with the interior thereof, and air pressure connections communicating with the interior of said rim, and in which the stationary member comprises a hollow member having an arcuate surface conforming to the periphery of said drum and spaced apertures in said surface communicating with the interior of said member, and pressure connections communicating with the interior of said member.

4. A pneumatic drive for transporting tape comprising a first rotary member having a plurality of air ports on a peripheral surface thereof, a stationary member having a surface opposing said peripheral surface of said rotary member and including a plurality of ports, said tape adapted to travel between said opposing surfaces, means applying simultaneously a suction to the ports of one of said members and an air blast to the ports of the other of said members, and means for reversing the action of said suction and blast applying means, whereby the tape is forced against the members for transport thereby, or against the stationary member and held immobile thereby.

5. The method of intermittently driving a tape by means of a continuously moving member and a closely positioned stationary member comprising placing the tape between said members, producing an air pressure of a predetermined sense adjacent the surface of said moving member and an air pressure of the opposite sense adjacent the surface of said stationary member and alternately reversing the sense of said air pressures to cause said tape alternately to adhere to said moving member and to said stationary member.

References Cited in the file of this patent
UNITED STATES PATENTS

| | | |
|---|---|---|
| 1,007,080 | Evans | Oct. 31, 1911 |
| 1,418,145 | Fischer | May 30, 1922 |
| 1,629,154 | Ybarrondo | May 17, 1927 |
| 1,691,963 | Dexter | Nov. 20, 1928 |
| 2,044,856 | Norton | June 23, 1936 |
| 2,532,003 | Wyer | Nov. 28, 1950 |
| 2,660,113 | Gullixson et al. | Nov. 24, 1953 |
| 2,684,240 | Lindsey | July 20, 1954 |
| 2,714,006 | Layden | July 26, 1955 |